US006665918B1

(12) United States Patent
Williams

(10) Patent No.: US 6,665,918 B1
(45) Date of Patent: Dec. 23, 2003

(54) HARMONIC DAMPER PULLEY REMOVAL TOOL

(75) Inventor: Danny Williams, Clarinda, IA (US)

(73) Assignee: Lisle Corporation, Clarinda, IA (US)

( * ) Notice: Subject to any disclaimer, the term of this patent is extended or adjusted under 35 U.S.C. 154(b) by 0 days.

(21) Appl. No.: 10/368,106

(22) Filed: Feb. 18, 2003

(51) Int. Cl.[7] .................................................. B23P 19/04

(52) U.S. Cl. ........................ 29/259; 29/898.08; 29/252; 29/261; 29/263

(58) Field of Search .......................... 29/244, 245, 253, 29/256, 258, 259, 260, 261, 262, 426.5, 898.08

(56) References Cited

U.S. PATENT DOCUMENTS 5,255,435 A * 10/1993 Shultz ..................... 29/898.08
5,419,027 A * 5/1995 McPeak et al. ............... 29/252

OTHER PUBLICATIONS

Scheley Products Inc., Catalog, p. 13, Item Part No. 97–400A, Harmonic Damper Pulley Puller.

* cited by examiner

*Primary Examiner*—Joseph J. Hail, III
*Assistant Examiner*—Daniel Shanley
(74) *Attorney, Agent, or Firm*—Banner & Witcoff, Ltd.

(57) ABSTRACT

A tool for removal of a pulley from a shaft includes articulated arms mounted on a hub with a thrust bolt provided to drive the hub and attached arms outwardly from a shaft on which the pulley is mounted. The arms comprise jaw members which in combination with wedge members ensure maintenance of the jaw members in mechanical contact with the pulley to thereby effect its removal from a shaft.

7 Claims, 4 Drawing Sheets

HARMONIC DAMPER PULLEY REMOVAL TOOL

BACKGROUND OF THE INVENTION

In a principal aspect, the present invention relates to a tool for removal or pulling of a harmonic damper pulley of Chrysler engineered vehicles from the shaft on which the pulley is mounted.

Chrysler engineered vehicles dating back to the year 1990 were engineered to include a harmonic damper associated with the vehicle engine. The harmonic damper is associated with a pulley or wheel mounted on a shaft in the engine compartment. In order to repair mechanisms associated with the harmonic damper it is appropriate and often necessary to remove the pulley or wheel from its mounting shaft. However, because of the design of the engine and the size of the engine compartment, the harmonic damper pulley is often difficult to access and remove. Thus, there has developed a need to provide a tool which would facilitate the removal of such a pulley. Such a tool will also have similar capability for pulley removal from a shaft in general inasmuch as most pulleys are similarly mounted on a shaft associated with the pulley. Thus, the described tool will have more universal application than just utility with respect to Chrysler engineered vehicles.

Heretofore, there have been tools designed for the removal of the harmonic damper pulley. One such tool is manufactured and sold by Schley Products, Inc., their product No. 97400A. The Schley Products tool incorporates a hub member with three articulated hook legs attached thereto. The legs fit over the internal hub of the pulley and a center axial drive rod may then be actuated to effectively pull the pulley from a shaft. Such a tool has been highly useful for the specific purpose described. However, with the development of new engines and new designs, the tool referenced tends to slip from the pulley hub thus disabling the utility of the tool. That is, the jaws of the tool, which are designed to engage the hub of the pulley, become disengaged thereby rendering the tool ineffective. Thus, there has developed a need to provide an improved pulley pulling tool or pulley removal tool.

SUMMARY OF THE INVENTION

Briefly, the present invention comprises a tool for removing a pulley of the type having a center hub with multiple radial spaced spokes connected from the hub and extending outwardly therefrom to a rim. The tool comprises a central hub member which has an axial threaded throughbore for receipt of a drive bolt or drive rod. A plurality of radial, equally spaced arms are pivotally attached to the center hub. The arms include jaw members which are designed to fit through the spokes of the pulley and engage the pulley hub. The device further includes a series of wedge members which are mounted on the outside face of the jaw members or jaw member arms and are adjustable so as to enable positioning thereof in a manner which will wedge the jaw members tightly in position between the pulley rim and hub to ensure that the jaw members will not be released from the center portion or hub of the pulley. Thus, actuation of the drive bolt against the center shaft on which the pulley is mounted will ensure removal of the pulley from its shaft.

Consequently, it is an object of the invention to provide an improved tool for removal of a pulley from a shaft wherein the pulley is of the type having a series of spokes emanating from a center hub and connected to a rim.

It is a further object of the invention to provide a tool for removal of a pulley from a hub wherein the tool comprises a center hub member with articulated jaw arms attached thereto and which further includes a series of magnetically attached wedge members for adjustment of the thickness of the arms whereby the arms may be inserted and wedged in the area or space between the center hub of the pulley and the outer rim thereof.

It is a further object of the invention to provide a tool for removal of pulleys from a shaft wherein the tool may be utilized for removal of pulleys associated with many different types of equipment and machinery and wherein pulleys are of the type having a center hub, radial spokes and outer rim defining a space between a center hub and the rim.

Another object of the invention is to provide a pulley removal tool which is rugged, inexpensive, efficient and easy to use.

These and other objects, advantages and features of the invention will be set forth in the detailed description which follows.

BRIEF DESCRIPTION OF THE DRAWING

In the detailed description which follows, reference will be made to the drawing comprised of the following figures.

DESCRIPTION OF THE PREFERRED EMBODIMENT

Figure 1:
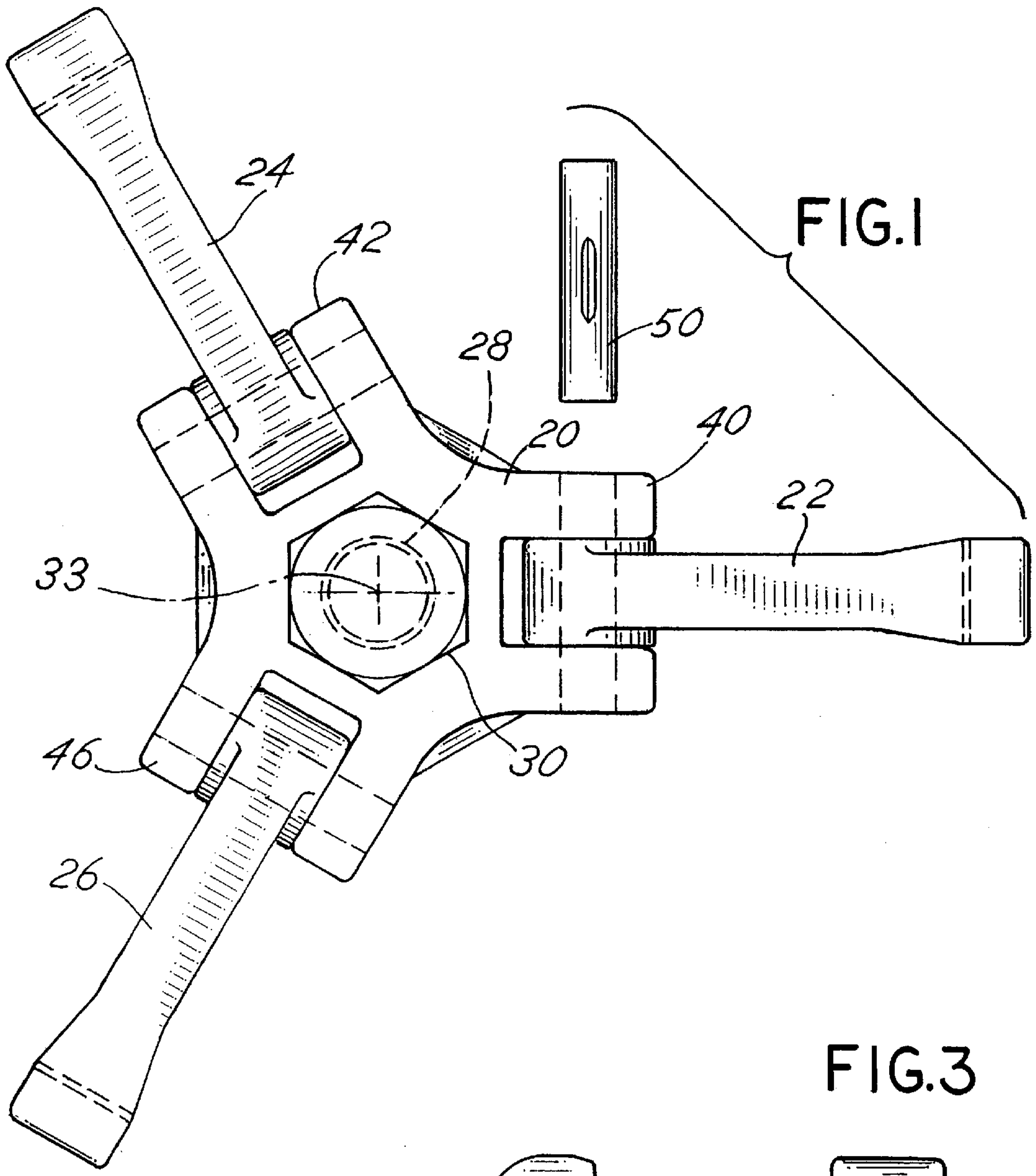
FIG. 1 is a top plan view of the assembled tool of the invention excluding the adjustable wedge members.

Referring to the figures, the tool of the invention includes a frame or hub member 20. The frame or hub member or hub 20 has three articulated arms or jaw members 22, 24 and 26 pivotally attached thereto so that the arms 22, 24 and 26 may articulate with respect to the frame or hub 20. An axial threaded throughbore or passage 28 in the frame or hub member 20 receives a thrust bolt 30 which is threadably inserted therein and is designed to engage with a shaft of a pulley or with a thrust rod 32 extending along an axis 33. The invention relates particularly to the combination of the elements described with attachable wedge members such as wedge members 34, 36 and 38 which are slidably attached to the outside surface of the arms 24, 26 and 28, respectively, and are held in position magnetically.

Figure 2:
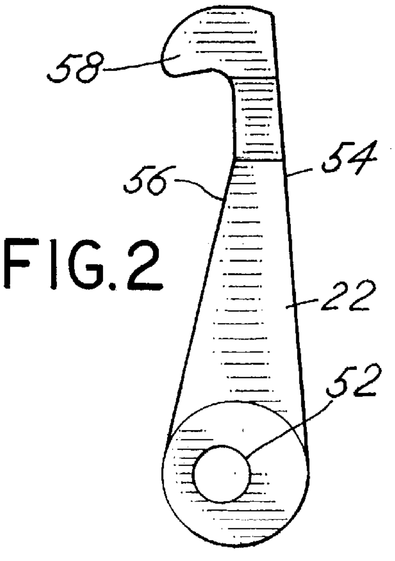
FIG. 2 is a side elevation of a jaw member associated with the tool of the invention.
Figure 3:
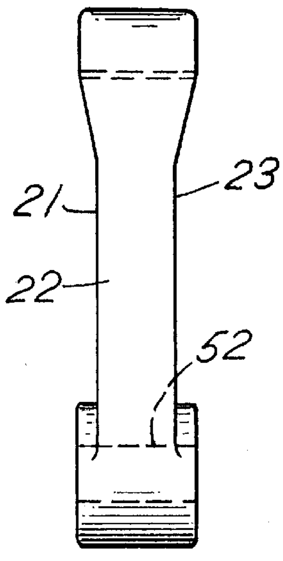
FIG. 3 is a side elevation of the jaw member of FIG. 2.
Figure 9:
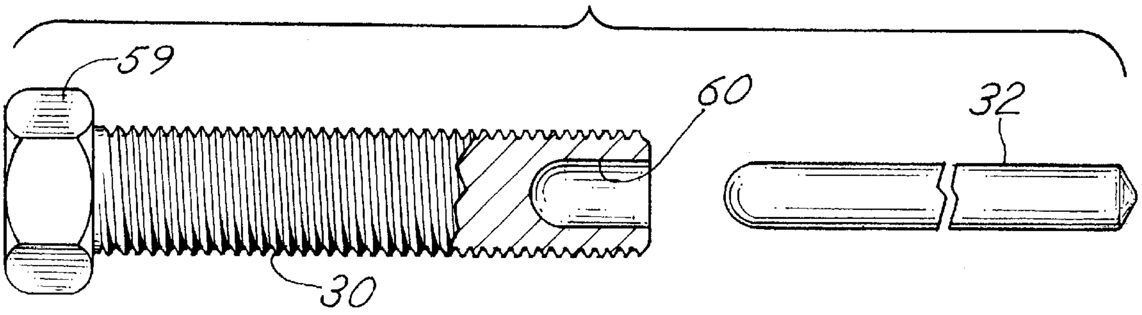
FIG. 9 is a side elevation of the thrust mechanism or bolt and thrust rod utilized to drive the pulley pulling tool of the invention.
Figure 10:
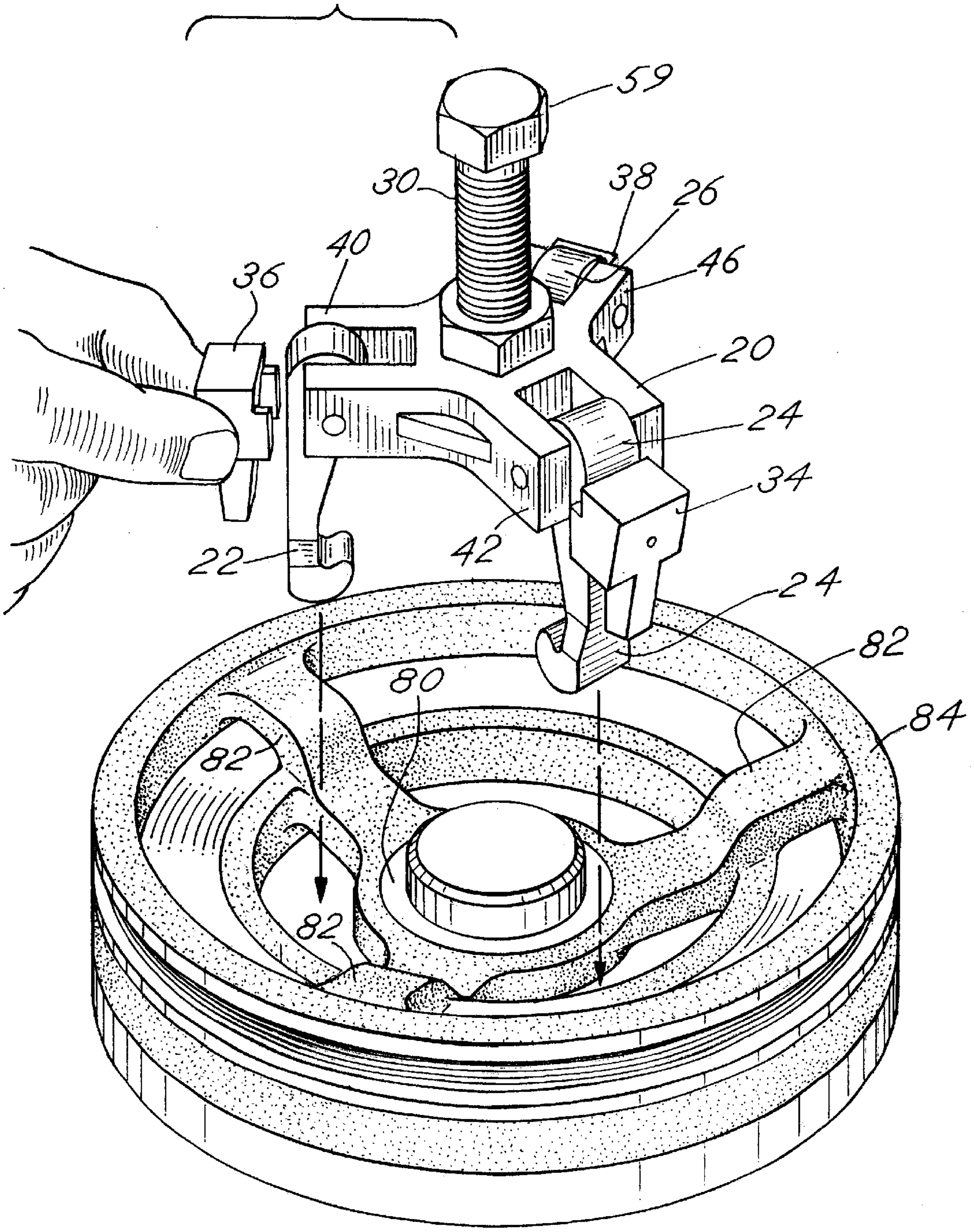
FIG. 10 is an isometric view of the assembled tool positioned for engagement with a pulley that is to be pulled.
Figure 11:
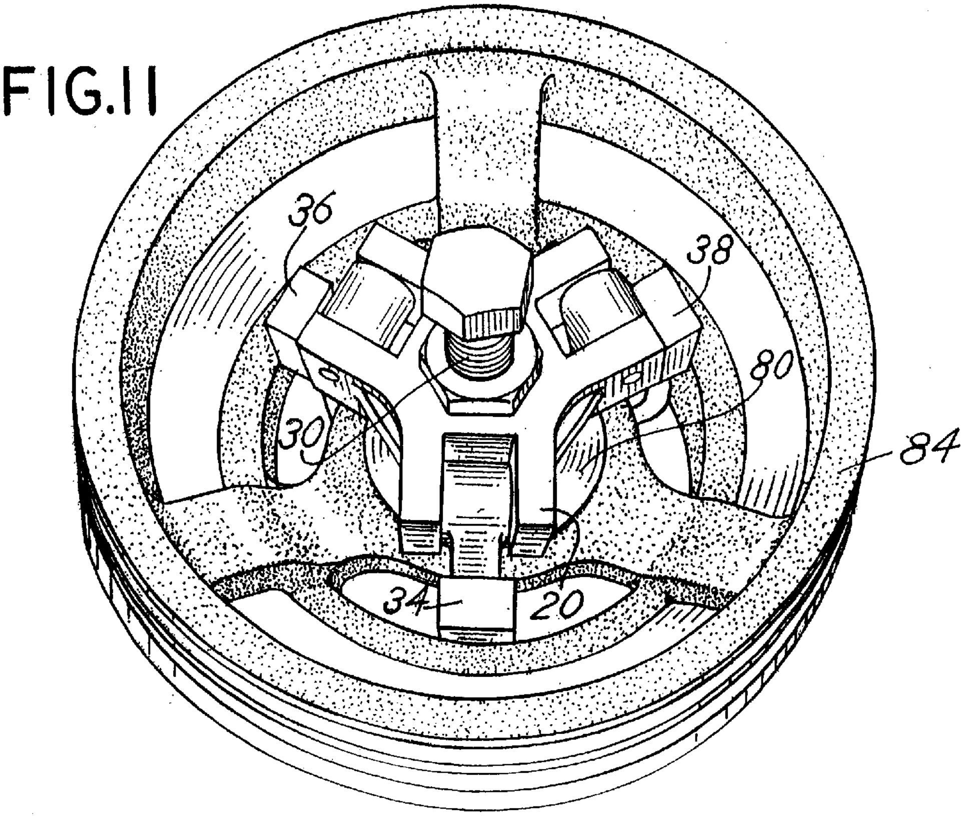
FIG. 11 is an isometric view of the tool positioned on a pulley to effect removal thereof from a shaft.
Figure 12:
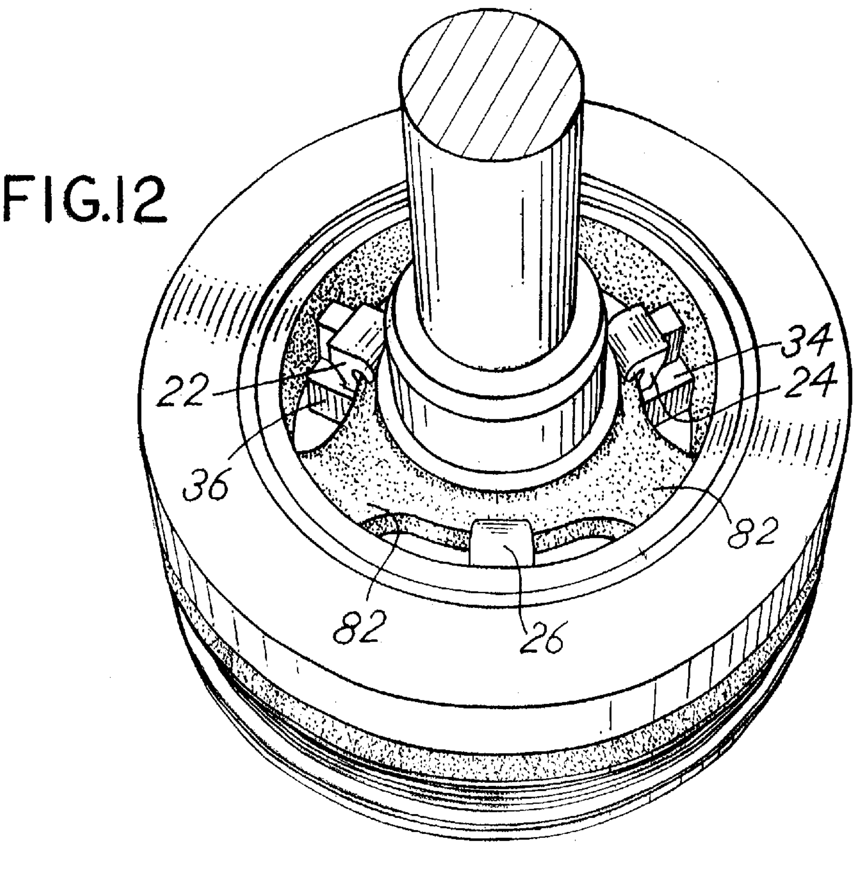
FIG. 12 is an isometric view of the tool in position as viewed from the opposite side of the pulley depicted in FIG. 11.

FIGS. 10, 11 and 12 show the entire assembly of the component parts. FIG. 1 depicts the combination of the arms 22, 24 and 26 with the frame or hub member 20 and the thrust bolt 30. FIGS. 2 and 3 depict in greater detail the jaw members or arms 22, 24 and 26. FIGS. 4–8 depict in further detail the adjustable wedge members 34, 36 and 38. FIG. 9 depicts in greater detail the thrust bolt 30 and thrust rod 32.

Referring therefore to FIG. 1, the frame 20 includes a center throughbore or passage 28 and three equally radially spaced outwardly extending frame arms 40, 42 and 46. The jaw members 22, 24 and 26 are attached by means of grooved pins, such as grooved pin 50, to the respective arms 40, 42 and 46 so that the jaw members or arms 22, 24 and 26 may pivot.

Referring to FIGS. 2 and 3 each jaw member 22, 24 and 26 includes a pin receiving passage 52 at one end thereof for receipt of pin 50. The jaw members 22, 24 and 26 include an outer surface 54 and an inner surface 56 with an inwardly extending jaw 58. Preferably, the outer surface 54 is flat and planar and extends the entire outside length of each jaw member 22, 24 or 26.

As depicted in FIG. 9 the thrust bolt 30 is threaded for coaction with the threaded passage 28. The thrust bolt 30 includes a hexagonal head 59 and a recessed counterbore opening 60 at the opposite end. The hexagonal head 59 enables turning of the bolt with a wrench so as to drive the thrust bolt 30. The counterbore opening 60 receives a thrust rod 32. Various lengths of thrust rod 32 may be utilized depending upon the configuration and the shape, etc. of the shaft from which a pulley is to be removed.

Figure 4:
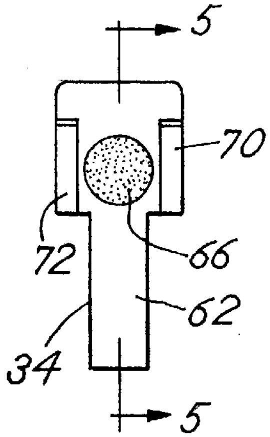
FIG. 4 is a bottom plan view of the typical adjustable wedge member incorporated with the tool of the invention.
Figure 5:
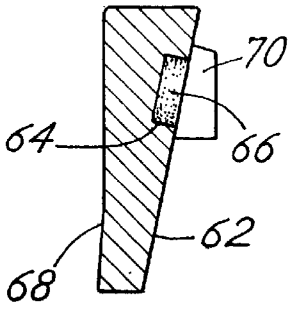
FIG. 5 is a side cross sectional view of the wedge member of FIG. 4 taken along the line 5—5.
Figure 7:
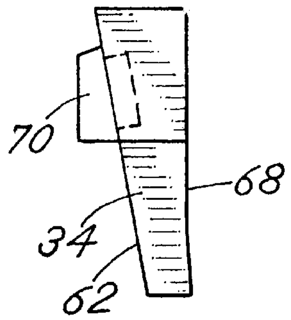
FIG. 7 is a side elevation of the wedge member of FIG. 4.
Figure 6:
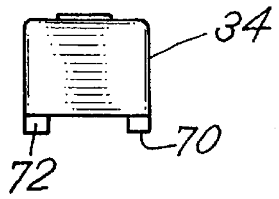
FIG. 6 is an end view of the wedge member of FIG. 4.
Figure 8:
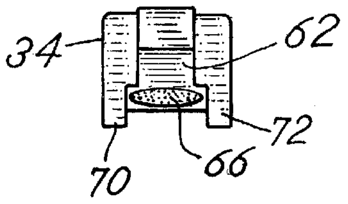
FIG. 8 is an opposite end view of the wedge member of FIG. 7.

FIGS. 4–8 depict in greater detail the wedge members 34, 36, 38 which are utilized in combination with the arms 22, 24 and 26. The wedge members 34, 36 and 38 are designed to fit on the outside face or surface 54 of each of the jaw members 22, 24 and 26 in a manner which will wedge or retain the jaw members 22, 24, 26 fixed in position and engagement with a pulley which is to be pulled by means of the tool. Thus, referring to the figures as exemplary of the wedge members 34, 36, 38, FIG. 4 depicts the bottom or underside face 62 in an elevation view of wedge member 34. The underside or face 62 includes a circular recess 64. The circular recess or pocket receives a cylindrical congruently sized magnet 66. The wedge member 34 further includes an outside surface 68. The inside surface 62 and outside surface 68 converge in order to provide the wedge member 34 with a wedge shape as depicted in cross sectional view of FIG. 5. Positioned on opposite sides of the magnet 66 and extending outwardly from the inside surface 62 are first and second extending retention tabs or tangs 70 and 72. The tabs or tangs 70 and 72 are spaced so that they will fit on opposite sides of a jaw member 22 and, in particular, on the opposite sides 21 and 23 of the jaw member 22 in FIG. 3 for retention of wedge member 34 against the outside surface 54. In this manner, because of this construction, the wedge members 34, 36, 38 may be slidably positioned against the outside face or outside surface 54 of jaw members, e.g. jaw member 22. The lateral or side tabs or tangs 70 and 72 will retain the wedge member 34 to preclude side slippage thereof from the jaw member 22.

FIGS. 10–12 illustrate the manner of use of the tool. The tool is used to remove a pulley member of the type including a central hub 80 with radiating spokes, such as spokes 82, connected to an outer rim 84. The jaws 22, 24 and 26 are inserted in the space between spokes 82 and the hub 80 and rim 84. The jaws 22, 24, 26 thus fit through a defined space on the outside of pulley hub 80. The center thrust bolt 30 fits against the shaft 81 on which the pulley is mounted. The wedge members 34, 36 and 38 may then be slidably inserted against the outside face or surface 54 of the jaw members 22, 24 and 26 and manually pushed into the space between the outer rim 84 and the jaw members 22, 24 and 26 to totally fill that space and preclude the jaw members 22, 24, 26 from slippage from the pulley hub 80. The thrust bolt 30 may then be rotated to drive the pulley from the shaft on which the pulley is mounted. The magnets 66 ensure retention of the wedge members 34, 36 and 38 in position against the jaw members or arms 22, 24 and 26. Of course, the jaw members or arms 22, 24 and 26 must be manufactured from a magnetic material such as an appropriate steel.

With the construction of the present invention, therefore the pulley may be easily and efficiently removed from a shaft 81 without slippage of the jaw members 22, 24 and 26 from engagement with the pulley. Upon removal of the pulley from the shaft 81, the wedge members 34, 36 and 38 may be easily removed by reversing the direction in which they were initially driven, either manually or with a hammer or similar tool. Additionally, the wedge members may be positioned initially in the space between the rim 84 in center hub section of the pulley 80 by manipulating with your fingers.

It is to be noted that the shape and configuration of the wedge members 34, 36 and 38, as well as the configuration of the jaw members 22, 24 and 26, may be altered in order to maintain the feature of providing wedge members which will enable positioning and maintenance of such position of the jaw members 22, 24 and 26 against the hub of a pulley which is to be removed. Thus, the subject matter of the invention and its use is to be limited only by the following claims and equivalents thereof.

What is claimed is:

1. A tool for removing a pulley having a center hub and multiple, radial, spaced spoke members emanating from the hub and connected to a rim, said tool comprising, in combination:

a center hub member having an axial, centerline axis and an axial, threaded throughbore and further including a plurality of radial, equally spaced arms;

a plurality of jaw members equal in number to the number of hub member spaced arms, each of said jaw members being pivotally attached to a separate arm and each jaw member pivotal toward the axial axis, said jaw members each including an outside face and an inwardly directed gripping hook for engaging the center hub of a pulley;

a drive bolt assembly in the threaded throughbore of the center hub member for adjustably impinging on a mounting shaft for a pulley; and a separate wedge member mounted on the outside face of each jaw member for retaining each jaw member wedged against the pulley center hub.

2. The tool of claim 1 wherein the wedge members are magnetically mounted on the jaw members and axially adjustable.

3. The tool of claim 1 or claim 2 wherein the wedge members include lateral tabs for retaining the wedge members on the jaw members.

4. The tool of claim 1 wherein the drive bolt includes a thrust rod axially mounted for engagement by a drive bolt.

5. The tool of claim 2 wherein the wedge members include a magnet.

6. A tool for removing a pulley having a center hub and multiple radial spaced spoke members emanating from the center hub, said spoke members connected to a rim, said tool comprising in combination:

a center hub member having an axial, centerline axis and an axial, threaded throughbore and further including a plurality of radial, equally spaced arms;

a plurality of jaw members equal in number to the number of hub member spaced arms each of said jaw members being pivotally attached to a separate arm and each jaw member pivotal toward the axial axis, said jaw members each including an outside face and an inwardly directed gripping hook for engaging the center hub of a pulley;

a drive bolt assembly in the threaded throughbore of the center hub member for adjustably impinging on a mounting shaft for a pulley; and a wedge member mounted on the outside face of each jaw member for retaining each jaw member wedged against the pulley center hub, at least one of said wedge members magnetically mounted on the associated jaw member and said wedge member being axially adjustable on the jaw member.

7. A tool for removing a pulley having a center hub and multiple radial spaced spoke members emanating from the center hub, said spoke members connected to a rim, said tool comprising in combination:

a center hub member having an axial, centerline axis and an axial, threaded throughbore and further including a plurality of radial, equally spaced arms;

a plurality of jaw members equal in number to the number of hub member spaced arms each of said jaw members being pivotally attached to a separate arm and each jaw member pivotal toward the axial axis, said jaw members each including an outside face and an inwardly directed gripping hook for engaging the center hub of a pulley;

a drive bolt assembly in the threaded throughbore of the center hub member for adjustably impinging on a mounting shaft for a pulley; and a wedge member mounted on the outside face of each jaw member for retaining each jaw member wedged against the pulley center hub, at least one of said wedge members including lateral tabs for retaining the wedge member mounted on the associated jaw member.

* * * * *